United States Patent [19]

Gessner et al.

[11] Patent Number: 5,447,426
[45] Date of Patent: Sep. 5, 1995

[54] TAKE-OFF PLATE DEVICE

[75] Inventors: Dieter Gessner, Karben, Germany; Thomas M. McGinley, Brampton, Canada

[73] Assignee: Husky Injection Molding Systems Ltd., Bolton, Canada

[21] Appl. No.: 86,658

[22] Filed: Jul. 6, 1993

[51] Int. Cl.[6] .................. B29C 33/44; B29C 49/70
[52] U.S. Cl. ................... 425/436 R; 249/68; 425/526; 425/534; 425/537
[58] Field of Search ............ 425/526, 534, 537, 438, 425/556, 554, 436 R; 249/66.1, 67, 68

[56] References Cited

U.S. PATENT DOCUMENTS

| Re. 33,237 | 6/1990 | Delfer, III | 425/556 X |
|---|---|---|---|
| 3,944,643 | 3/1976 | Sato et al. | 425/526 X |
| 4,102,626 | 7/1978 | Scharrenbroich | 425/526 |
| 4,209,290 | 6/1980 | Rees et al. | 425/526 X |
| 4,463,056 | 7/1984 | Steele | 425/526 X |
| 4,729,732 | 3/1988 | Schad et al. | 425/526 |
| 4,822,553 | 4/1989 | Marshall | 249/66.1 X |
| 4,950,152 | 8/1990 | Brun, Jr. et al. | 425/534 X |
| 5,114,327 | 5/1992 | Wiliamson et al. | 425/526 X |

FOREIGN PATENT DOCUMENTS

| 0158105 | 10/1985 | European Pat. Off. . |
|---|---|---|
| 4212115 | 8/1993 | Germany . |

OTHER PUBLICATIONS

English translation of German Patent Document No. 42 12 115.

*Primary Examiner*—Richard L. Chiesa
*Attorney, Agent, or Firm*—Bachman & LaPointe

[57] ABSTRACT

The present invention relates to an improved take-off plate device for removing molded articles from a molding machine and delivering them to a transfer or receiving station. The device of the present invention includes a plate, one or more tubes mounted to the plate for receiving molded articles, and one or more ejector bars for engaging portions of the molded articles to remove or eject them from the tubes. Each of the tubes is provided with a cooling passageway for effecting cooling of the molded articles as they are moved between the molding machine and the receiving station. A bottom plug, which is in contact with the cooling passageway, is provided in each tube to more efficiently cool an end portion of the molded article in the tube. Preferably, the bottom plug has an end surface which matches the shape of the molded article end portion.

19 Claims, 3 Drawing Sheets

TAKE-OFF PLATE DEVICE

BACKGROUND OF THE INVENTION

The present invention relates to an improved device for carrying injection molded plastic articles from a mold and for cooling said plastic articles while they are being carried. The invention further relates to improved means for ejecting or removing the plastic articles from the device.

The practice of removing injection molded plastic articles, such as PET preforms, from a mold by means of cooled tubes mounted on a robot take-off plate is well known in the art. U.S. Pat. Nos. 4,729,732 to Schad et al. and Re. 33,237 to Delfer exemplify two of the known take-off systems.

In the system shown in the Schad patent, a robot takeoff plate is carried by the molding machine and inserted between the platens defining the molding station when the platens are in a mold open position. The take-off plate has attached thereto a number of open ended hollow tubes for receiving parisons molded by the molding machine. The number of tubes associated with the plate is determined by the number of parisons molded by the machine during a single molding cycle. Each of the tubes for holding the parisons is connected at its base to a suction or vacuum source. The suction or vacuum is used to remove the parisons from the molding machine and to hold them in place in the tubes during transfer to a receiving station. After the take-off plate has been moved out from between the platens forming the molding station, it is rotated to a position adjacent the receiving station. The parisons are then delivered to pallets at the receiving station by releasing the suction or vacuum. The parisons are positioned in the release mode so that their open neck portions engage plugs supported by a frame on the pallets.

The Delfer patent shows an approach similar to Schad's for removing molded articles, such as parisons, from a molding machine. As shown in FIG. 3 of the Delfer patent, the robot take-off plate has a number of open ended tubes embedded therein for receiving the molded articles. Again, the number of tubes present in the plate is determined by the number of molded articles produced during a single molding cycle. Each of the tubes is connected to a suction or vacuum source and/or a pressurized fluid source. The vacuum is used to retain the molded articles in the tubes, while the pressurized fluid is used to eject the molded articles from the tubes. The plate also has a series of cooling passages for cooling the plastic articles held in the tubes. The cooling passages may contain a circulating cooling fluid.

The principal disadvantage of these systems is that should one of the molded articles stick in its tube while the others are successfully ejected, there is typically insufficient air or fluid pressure in the sticking tube to eject the stuck article. This is because all of the other empty tubes provide an open vent to discharge most of the available compressed air or fluid.

Mechanical devices to eject molded articles from a take-off plate have also been used in molding systems. For example, a mechanical take-off plate ejector device used by Krupp has been illustrated in *Plastics Technology*, September, 1989, pp. 39–40. In the Krupp machine, mechanical knock-out pins are provided in each tube. The pins are mounted on a common ejector plate behind the main take-off plate. Actuation of this ejector plate effects simultaneous ejection of all molded articles or preforms within the carrying tubes. The disadvantage of this approach is the additional space required to accommodate the ejector plate. As a result of the presence of the ejector plate, the mold open stroke must be increased to allow the thicker tooling plate assembly to enter between the open mold halves to pick up the preforms. The additional opening and corresponding closing stroke thus required penalizes the molding cycle time. A second disadvantage to this device is the increased weight caused by the ejector plate, the individual pins, and the plate's actuation mechanism. This additional weight reduces the robot's drive mechanism's ability to move the plate assembly quickly in and out of the mold and consequently penalizes the molding cycle time further.

Another mechanical approach has been employed in some molding machines manufactured by the assignee of the instant application. This mechanical approach involves placing a sliding plug in each of the tubes used to receive the molded articles, preforms or parisons. In the loading position, the plug is retracted by the vacuum pulling the molded article into the tube. A ball check is provided to maximize the vacuum flow. When the vacuum is replaced with a positive air pressure, the ball check is closed to limit the air loss if some of the molded articles stick in the tubes. The plug is blown forward by the air pressure to push out the cooled molded article within the tube. Unfortunately, this approach did not completely or satisfactorily solve the problem of molded articles sticking in the tubes.

In view of the foregoing problems, the inventors set out for themselves the principal object of providing an improved system for carrying molded articles, for cooling the articles while they are being carried, and for ejecting the molded articles from this robot take-off plate.

It is also an object of the present invention to provide an ejection system for which there is no increase in the overall size of the tooling or take-off plate assembly.

It is still a further object of the present invention to provide an ejection system as above which does not increase the mold stroke or the molding cycle time.

Still other objects and advantages of the present invention will become more apparent from the following description and drawings wherein like reference numerals depict like elements.

SUMMARY OF THE INVENTION

In accordance with the present invention, it has now been found that the foregoing objects and advantages may be readily obtained and an improved device is provided for removing molded articles from an injection molding apparatus and for cooling the molded articles while they are being transferred to a receiving station.

The device of the present invention comprises an improved device for carrying heated injection molded plastic articles, such as PET preforms or parisons, from a mold to a receiving station and for cooling the molded articles while they are being moved. The device comprises a plate, one or more hollow tubes each having a hollow central portion for receiving a molded article in a heated condition, attached to the plate, and means for mechanically ejecting the molded article(s) from the hollow tube(s). The mechanical ejecting means is formed by an ejector device mounted to the plate. The ejector device in operation contacts a portion of the molded article located externally of the hollow tube. In a preferred embodiment, the ejector device comprises an ejector bar, movable between retracted and extended positions, having laterally extending portions for engaging a circumferentially extending ledge portion on the molded article.

Each tube mounted to the plate is also provided with means for cooling a molded article residing therein. The cooling means comprises a cooling passageway running substantially the entire length of the tube and a bottom plug, each in contact with a supply of coolant. The bottom plug is preferably provided with a surface shaped to match the end portion of the molded article. In a preferred embodiment, the cooling passageway is formed between an inner tube member defining the hollow central portion of the tube and an outer sleeve defining at least a portion of an external surface of the tube.

The plate on which the device of the present invention is mounted comprises a take-off plate which can be inserted between the platens of a molding machine to remove an article or articles molded during a single mold cycle. Generally, the plate will have a plurality of molded article receiving and carrying tubes mounted to it. The number of tubes on the plate typically corresponds to the number of molded articles produced during a molding cycle or a multiple thereof. If desired, the plate may be provided with a number of ejector bars for removing molded articles from the tubes. For example, there may be an ejector bar for each vertical row or column of twelve tubes.

Other details of the present invention will become more apparent from the following description and drawings wherein like reference numerals depict like elements.

DETAILED DESCRIPTION OF THE PREFERRED EMBODIMENT(S)

Figure 1:
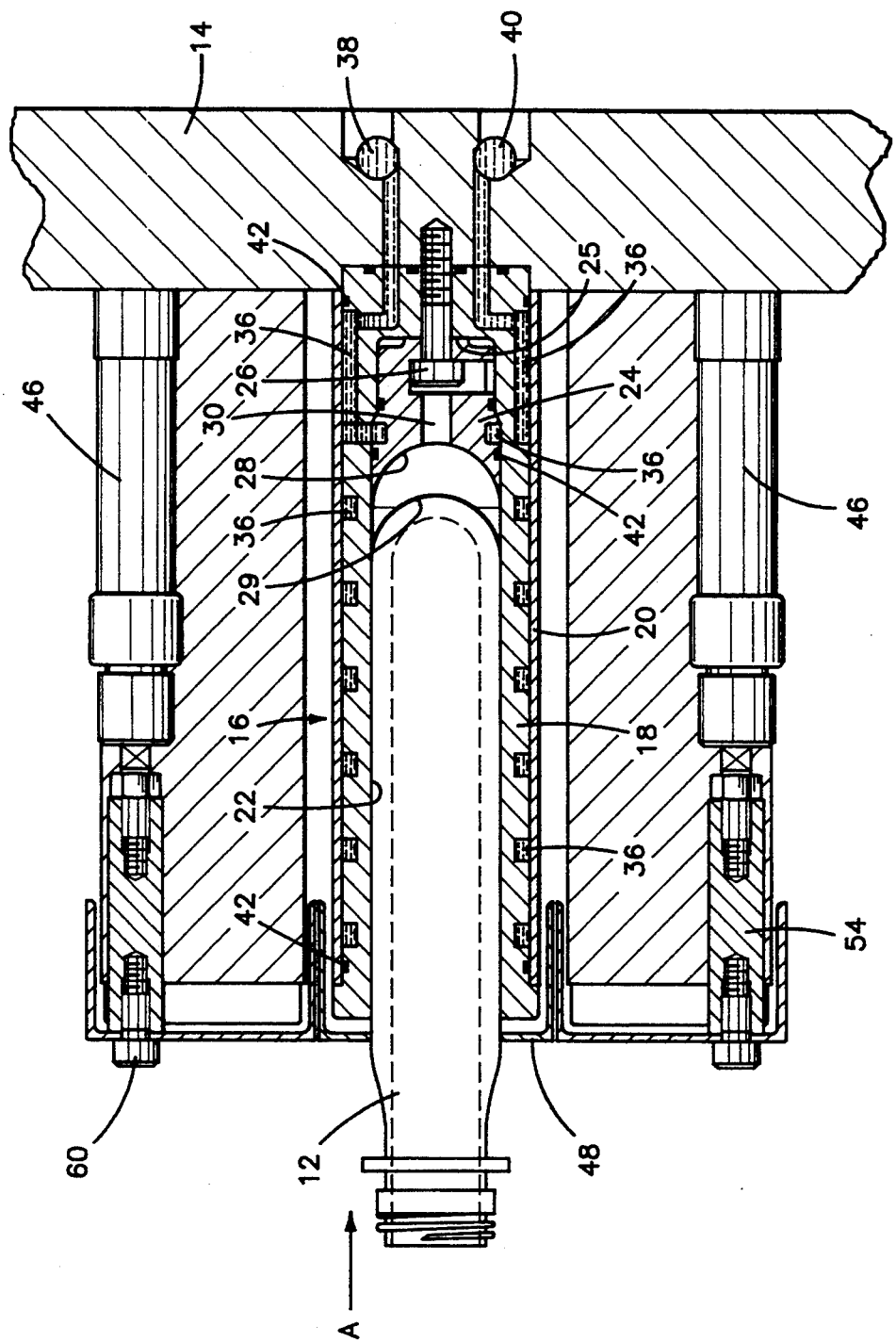
FIG. 1 is a sectional view of a carrying device in accordance with the present invention with a molded article or preform partially inserted within the tube.

Referring now to the drawings, FIG. 1 illustrates a carrying device 10 for holding a molded article 12 as it is being transferred between a mold (not shown) and a receiving station (not shown) and for cooling the molded article as it is being transferred. The molded article 12 can have any desired shape and may be formed from any desired material. Typically, the device 10 will be used to transfer molded plastic articles such as PET preforms or parisons.

The device 10 includes a plate 14 formed from a metallic material such as stainless steel. The plate 14 cooperates with an injection molding machine (not shown) for removing articles molded during a molding cycle. The plate 14 may be inserted between the platens (not shown) of a molding station for removing molded articles in the manner taught by U.S. Pat. No. 4,729,732 to Schad et al., which is incorporated by reference herein. After the molded articles have been removed from the molding station, the plate is moved to a withdrawn position where the molded articles are transferred to another station such as a receiving station.

As shown in FIG. 1, a tube 16 is mounted to the tooling plate 14. For most applications, a plurality of such tubes are mounted to the plate 14. The tube 16 is formed by an inner tube member 18 and an outer sleeve 20, both of which are preferably formed from a metallic material such as stainless steel. As can be seen from this figure, the outer sleeve 20 extends along and surrounds most of the inner tube member 18. If desired, the outer sleeve 20 and the inner tube member 18 may be coextensive. The inner tube member 18 defines a hollow central portion 22 or receptacle in which the molded article 12 is received.

The tube 16 is preferably fastened to the tooling plate 14 by a bottom plug 24, formed from aluminum or some other heat conductive material, secured to the tooling plate. The bottom plug is seated against an end wall 25 of the inner tube member 18 and is secured in a fixed position by means of screw or bolt 26 which is received in a threaded hole in the plate 14.

The bottom plug 24, as will be explained later, forms part of the means for cooling the molded article. To this end, it has an end surface 28 shaped to match an end portion 29 of the molded article 12. For example, where the end portion 29 of the article 12 is spherically shaped, the end surface 28 also will be spherically shaped. It has been found that by providing a matching contouring, the end of the molded article, which is typically the hottest portion of the article, may be more efficiently cooled.

The plug 24 is provided with a passageway 30 which communicates with a vacuum or suction source (not shown). The passageway 30 may communicate with the vacuum source in any desired manner. For example, the passageway 30 could be connected to the vacuum source via a conduit in the tooling plate. The application of a vacuum via such a conduit and the passageway 30 causes the molded article to move into the tube, in the direction of arrow A. As the molded article cools and shrinks, the vacuum will cause the molded article to be drawn into the tube until the end portion 29 contacts the plug surface 28. The vacuum is preferably applied throughout the transfer operation.

A cooling passageway 36 is provided to effect a cooling of the molded article while it is resident within the tube 16. The cooling passageway 36 is preferably formed between the inner tube member 18 and the outer sleeve 20. The passageway 36 may have any desired extent, although it is preferred that it extend substantially the entire length of the tube 16. Coolant from a supply (not shown) is supplied to the passageway 36 via a conduit 38 in the tooling plate. After the coolant has travelled through the passageway 36, it is returned to the supply via another conduit 40 in the tooling plate. Seals 42 are provided to prevent leakage of the cooling fluid.

It has been found that the molded article 12 is more effectively cooled by the provision of the matching contoured surface 28 in the plug 24. This is because the plug is cooled by the coolant in the passageway 36 which extends into the plug 24 and the end surface 28 transfers the desired cooling effect to the end portion 29 of the molded article by direct contact. In the prior art, the end of the molded article, which is typically its hottest part, does not directly contact any cooled surface and as a result takes longer to cool. By providing direct contact cooling, the present invention enhances the quality of the molded article and optimizes cooling cycle time.

Figure 2:
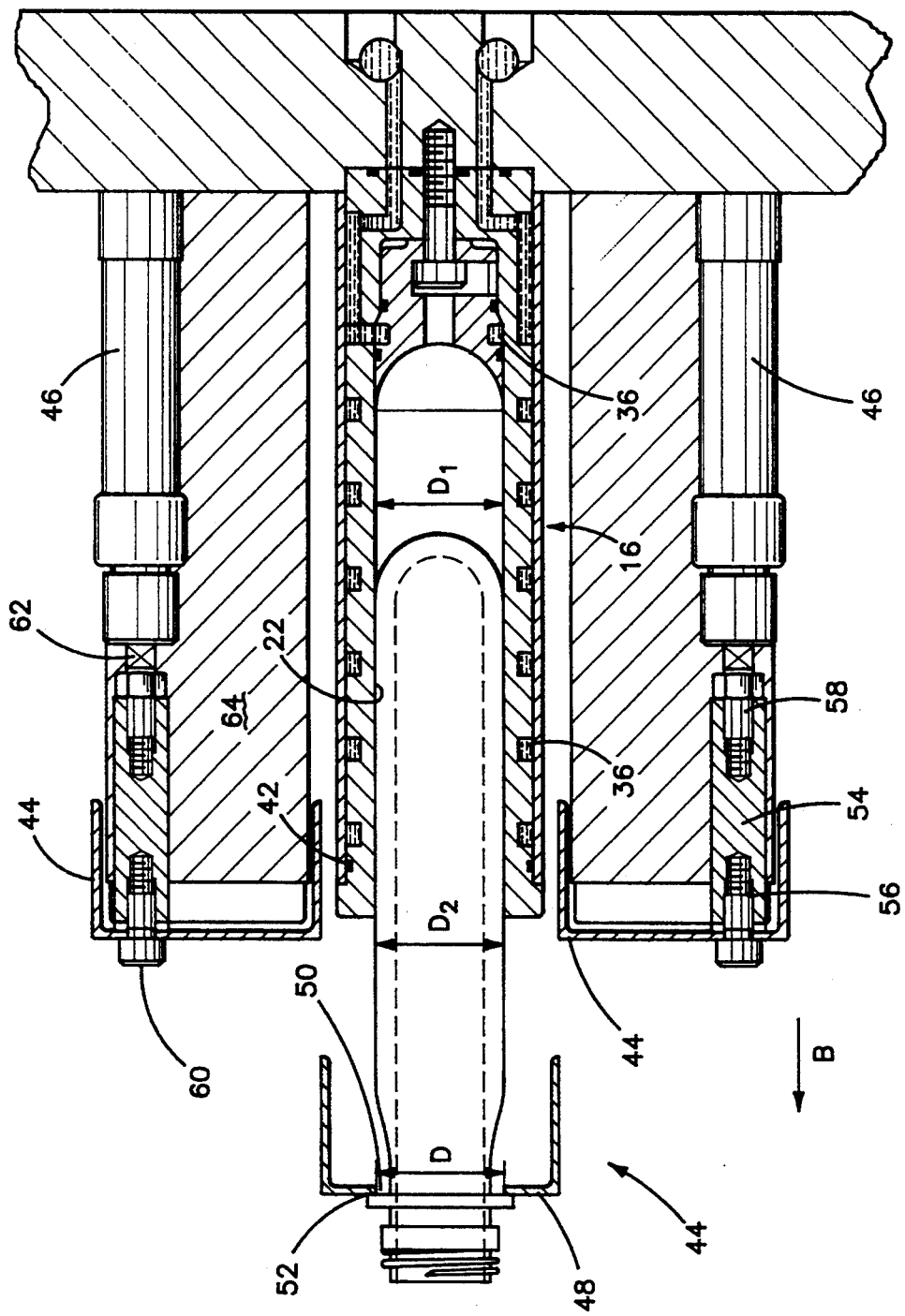
FIG. 2 is a sectional view of the carrying device of FIG. 1 showing the molded article being ejected from the tube.

As previously discussed, the device 10 also includes mechanical means for ejecting the molded article 12 from the tube 16. Referring now to FIGS. 1 and 2, ejection of the molded article 12 from the tube 16 is effected by an ejector bar 44. Preferably, the ejector bar 44 is formed from a lightweight material such as aluminum so as to minimize weight considerations. The ejector bar is moved between retracted and extended positions by one or more actuators 46. The actuator(s) 46 may comprise any suitable actuator known in the art. For example, each of the actuators may be a piston-cylinder unit. Preferably, each actuator is also formed from lightweight materials. Each ejector bar 44 may be connected to the actuator(s) 46 by one or more metallic connecting members 54. As shown in the figures, the connection member 54 has threaded holes 56 and 58 for receiving a bolt 60 and a threaded portion of a stem 62 extending from the piston portion (not shown) of the actuator 46. A metallic stop member 64 is preferably provided to limit the movement of the ejector bar 44 as it is being withdrawn. The stop member 64 may be mounted to the plate 14 using any suitable means known in the art.

As shown in the figures, each ejector bar 44 has laterally extending portions 48 which define a hole 50. The hole 50 preferably has a diameter D slightly larger than the diameter $D_1$ of the hollow central portion of the tube 16 and the outer diameter $D_2$ of the molded article 12.

To remove a molded article 12 from the tube 16, the ejector bar 44 is moved by actuator(s) 46 in the direction B to an extended position. The laterally extending portions 48 engage a circumferentially extending portion 52 on the molded article and push the molded article 12 from the tube 16. Generally, ejection takes place while the plate 14 is in a substantially horizontal position so that the molded articles 12 fall by gravity onto a receiving or transfer station (not shown) such as a conveyor. While ejection is taking place, the vacuum used to draw the molded article 12 into the tube 16 is shut off. After ejection has been completed, the ejector bar 44 is returned to its retracted position by the actuator(s) 46.

Figure 3:
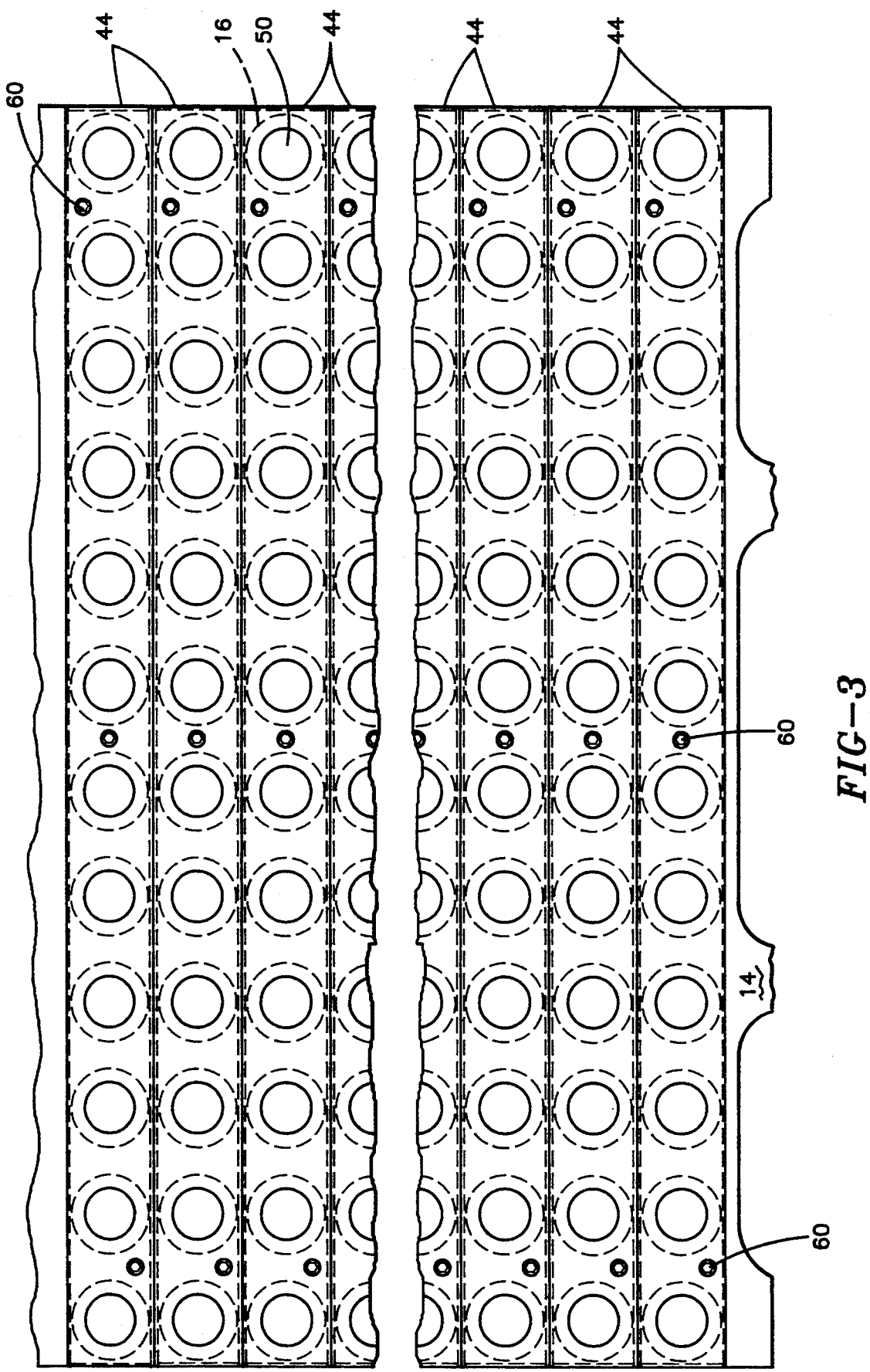
FIG. 3 illustrates a plan view of a tooling plate assembly having a plurality of tubes for receiving molded articles and a plurality of ejector bars.

FIG. 3 illustrates a plate 14 having a plurality of tubes 16 for receiving molded articles and a plurality of ejector bars 44 for ejecting the molded articles from the tubes 16. As shown in this figure, each ejector bar may have twelve holes 50 through which molded articles may be loaded into the tubes 16 positioned beneath the ejector bar. Furthermore, each ejector bar may be moved between extended and retracted positions by two or more actuators (not shown). While the bars may be moved individually by respective actuators, it is also possible to move the bars in sets so that the molded articles can be ejected after extended periods of cooling. For example, a set of preforms in the tubes forming certain columns may be retained in the take-off plate longer than those preforms in tubes forming other columns. Hence, the bars 44 for the preforms in the second set of columns may be actuated while the bars 44 for the preforms in the first set of columns are not operated.

While the ejector bar 44 has been illustrated in FIG. 3 as having twelve holes, it may actually have any desired number of holes. Similarly, while the ejector bar has been shown as spanning one column of tubes, it may actually span two or more columns of tubes.

It has been found that the present invention provides numerous advantages in addition to the cooling efficiency advantages previously discussed. The principal advantage of the ejection design of the present invention over the prior art is that there is no increase in overall size of the tooling or take-off plate assembly. Still further, the mold stroke need not be increased for loading of the molded articles. Since the ejector bars are manufactured from aluminum and the actuation mechanism therefor is made from lightweight materials, the increase in the weight of the tooling plate assembly is minimized. Consequently, there is no penalty to molding cycle time.

Tests conducted by the assignee of the instant application have shown that up to 2 seconds can be cut from typical molding cycle time because of the positive mechanical ejection provided for the molded articles. This is a significant advantage over air blow techniques which require a wait for the "blow" air supply to build up pressure before parts can be ejected. In such systems, a time delay was typically included to allow air pressure to dislodge slightly stuck preforms. Such time penalties are eliminated by the design of the present invention.

It is apparent that there has been provided in accordance with this invention an improved take-off plate device which fully satisfies the objects, means, and advantages set forth hereinbefore. While the invention has been described in combination with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. An improved carrying device for holding and cooling a heated molded article, said carrying device comprising:
   a plate;
   a hollow tube attached to a first surface of said plate, said hollow tube having a hollow central portion for receiving said molded article in a heated condition; and
   means for mechanically ejecting said molded article from said hollow tube, said mechanical ejecting means comprising an ejector bar mounted to said plate for movement along an axis substantially perpendicular to said first surface between a retracted position and an extended position wherein said ejector bar first contacts a portion of said molded article located externally of said hollow tube, said ejector bar being mounted to said plate by an actuator for moving said ejector bar between said retracted and extended positions.

2. The device of claim 1 further comprising:
   vacuum means for drawing said molded article into said tube.

3. The device of claim 1 further comprising:
   means for cooling said molded article while said molded article is in said hollow tube.

4. The device of claim 3 further comprising:
   said tube including an inner tube member forming a receptacle for said molded article and an outer sleeve substantially surrounding said inner tube member; and
   said cooling means comprising a coolant passageway formed between said inner tube member and said outer sleeve.

5. An improved carrying device for holding and cooling a heated molded article, said carrying device comprising:
   a plate;
   a hollow tube attached to a first surface of said plate, said hollow tube having a hollow central portion for receiving said molded article in a heated condition;
   means for mechanically ejecting said molded article from said hollow tube, said mechanical ejecting means comprising an ejector means mounted to said plate for movement along an axis substantially perpendicular to said first surface between a retracted position and an extended position wherein said ejector means first contact a portion of said molded article located externally of said hollow tube;
   said ejector means comprising an ejector bar mounted to said plate; and
   said ejector bar having at least one hole slightly larger in diameter than the hollow central portion of the tube.

6. The device of claim 5 further comprising:
   at least one actuation device for moving said ejector bar between said retracted and extended positions, said at least one actuation device mounting said elector bar to said first surface of said plate.

7. The device of claim 5 wherein said molded article has a circumferentially extending ledge portion and said ejector bar has laterally extending portions for engaging said ledge portion, said laterally extending portions defining said at least one hole.

8. An improved carrying device for holding and cooling a heated molded article, said carrying device comprising:
   a plate ;
   a hollow tube attached to a first surface of said plate, said hollow tube having a hollow central portion for receiving said molded article in a heated condition;
   means for mechanically ejecting said molded article from said hollow tube, said mechanical ejecting means comprising an ejector means mounted to said plate for movement along an axis substantially perpendicular to said first surface between a retracted position and an extended position wherein said ejector means first contacts a portion of said molded article located externally of said hollow tube;
   means for cooling said molded article while said molded article is in said hollow tube;
   said tube including an inner tube member forming a receptacle for said molded article and an outer sleeve substantially surrounding said inner tube member;
   said cooling means comprising a coolant passageway formed between said inner tube member and said outer sleeve;
   a bottom plug fixedly positioned within said inner tube member;
   said bottom plug mounting said hollow tube to said plate; and
   said bottom plug having a surface shaped to match an end portion of said molded article.

9. The device of claim 8 further comprising:
   said bottom plug being in contact with said coolant passageway and providing direct contact cooling to said molded article.

10. The device of claim 8 further comprising:
    said bottom plug having a passageway therein; and
    said passageway communicating with a vacuum source,
    whereby a vacuum is applied via said passageway to draw said molded article into said tube.

11. An improved system for cooling a heated molded article while said molded article is being transferred by a robot take-off plate, said system comprising:
    a hollow tube for receiving said molded article, said hollow tube having a central portion into which said molded article is drawn;
    means for cooling said molded article while said molded article is in said hollow tube, said cooling means including a cooling passageway extending substantially the entire length of said hollow tube and a plug positioned within said hollow tube; and
    said plug communicating with said cooling passageway and contacting an end portion of said molded article to effect cooling of said end portion and thereby cooling of said molded article.

12. The system of claim 11 wherein said end portion of said molded article is spherical in shape and said plug has a spherically shaped surface for contacting said spherical end portion.

13. The system of claim 11 wherein:
    said hollow tube is formed by an inner tube member and an outer sleeve member; and
    said cooling passageway is formed between said inner tube member and said outer sleeve member.

14. An improved arrangement for removing molded articles from a molding machine and for cooling said molded articles while transferring the molded articles to a receiving station, said arrangement comprising:
    a plate;
    a plurality of tubes mounted to a surface of said plate for receiving said molded articles; and
    ejector means for removing molded articles positioned within said tubes, said ejector means comprising at least one ejector bar mounted to said plate by an actuator, said at least one ejector bar being movable in a direction substantially transverse to said surface of said plate, said at least one ejector bar having means for engaging a portion of an individual molded article to facilitate removal of said individual molded article from a respective one of said tubes.

15. The arrangement of claim 14 further comprising:
    said ejector means comprising at least two ejector bars; and
    said ejector bars being individually movable.

16. The arrangement of claim 14 further comprising:
    said ejector means comprising a plurality of ejector bars; and
    said ejector bars being movable in sets.

17. The arrangement of claim 14 wherein each said tube includes means for cooling a molded article lodged within said tube.

18. The arrangement of claim 14 further comprising means for drawing said molded articles into said tubes.

19. An improved arrangement for removing molded articles from a molding machine and for cooling said molded articles while transferring the molded articles to a receiving station, said arrangement comprising:
    a plate;
    a plurality of tubes mounted to a surface of said plate for receiving said molded articles;

ejector means for removing molded articles positioned within said tubes, said ejector means comprising elector bars mounted to said plate and movable in a direction substantially transverse to said surface of said plate, said ejector bars each having means for engaging a portion of an individual molded article to facilitate removal of said individual molded article from a respective one of said tubes;

said plurality of tubes being arranged in a plurality of columns; and said ejector bars comprising an ejector bar for each of said columns, each said ejector bar having a plurality of holes therein for allowing molded articles to be inserted into said tubes in said column.

* * * * *